United States Patent [19]

Guignard et al.

[11] 4,294,662
[45] Oct. 13, 1981

[54] PROCESS FOR THE FINAL ASSEMBLY OF A NUCLEAR REACTOR VESSEL

[75] Inventors: Paul Guignard, Le Creusot; Alain Commeau, Montchanin, both of France

[73] Assignee: Framatome, Courbevoie, France

[21] Appl. No.: 150,224

[22] Filed: May 12, 1980

[30] Foreign Application Priority Data

May 16, 1979 [FR] France ............................. 79 12399

[51] Int. Cl.³ ............................................. B23K 31/06
[52] U.S. Cl. .................................... 219/61; 219/61.13; 219/137 R; 220/75; 228/33; 228/256; 376/260; 376/463
[58] Field of Search ................. 176/87; 219/61, 61.13, 219/137 R; 220/75, 76; 228/256, 33

[56] References Cited

U.S. PATENT DOCUMENTS

| | | | |
|---|---|---|---|
| 3,137,782 | 6/1964 | Rieppel | 219/61 |
| 3,328,556 | 6/1967 | Nelson | 219/61 |
| 3,990,941 | 11/1976 | Scholz | 176/87 |
| 4,142,085 | 2/1979 | Knipstrom | 219/61 |
| 4,182,950 | 1/1980 | Boros | 219/61 |

*Primary Examiner*—Donald P. Walsh
*Attorney, Agent, or Firm*—Haseltine & Lake

[57] ABSTRACT

The invention concerns a process for the final assembly of a nuclear reactor vessel comprising two sub-assemblies which are brought together and welded along mating surfaces. At least three female centering stubs, each associated with a seat recessed relative to the outer surface of the stub, are provided on the mating surface of one of the sub-assemblies, and at least three male centering stubs, corresponding to the seats of the female stubs, are provided on the mating surface of the other sub-assembly, the positions of the stubs being registered relative to elements for positioning internal fitments of the vessel. The two sub-assemblies are brought together to engage the male stubs in the female stub seats and to bring projecting annular ridges on the mating surfaces into contact. A key is inserted into a socket defined by one of the pairs of stubs and the stubs are then joined to each other by point-welds. An annular space defined between the mating surfaces of the sub-assemblies and delimited by a wall provided by the contacting ridges is then partially filled with filler metal. The centering stubs, wall and part of the deposited metal are then removed before welding is completed by filling the gap between the mating surfaces with filler metal.

The invention is particularly applicable to the assembly of vessels for pressurized-water nuclear reactors comprising upper and lower sub-assemblies, which are assembled in a horizontal position.

5 Claims, 5 Drawing Figures

PROCESS FOR THE FINAL ASSEMBLY OF A NUCLEAR REACTOR VESSEL

The invention relates to a process for the final assembly of a nuclear reactor vessel formed by two sub-assemblies each possessing symmetry of revolution, which sub-assemblies have been assembled and machined so as to provide elements for positioning the internal fitments of the vessel.

In the construction of nuclear reactor vessels, in particular of vessels of pressurised-water nuclear reactors, elements such as rings, flanges or spherical end caps are assembled during a first stage in the form of sub-assemblies, within which components are placed and machined which components will serve to position and hold the members which will be arranged within the vessel once the assembly of this vessel is completed.

In the case of pressurised-water nuclear reactors, the vessel, of essentially cylindrical form and closed by spherical end caps, comprises a large number of individual components which are assembled, during a first stage, to form two sub-assemblies, namely an upper sub-assembly and a lower sub-assembly, before final assembly.

The uppeer sub-assembly comprises in particular the vessel flange which is intended to receive the cover, and the ring carrying the pipe connections. The lower sub-assembly generally comprises the core-ring, the lower ring and a spherical end cap.

During the manufacture of these sub-assemblies, a certain number of elements intended for supporting, guiding and positioning the internal fitments within the vessel are arranged inside the respective sub-assembly and are machined to their final dimensions.

It is therefore necessary, when final assembly of the vessel takes place, to preserve a very good alignment between the elements which correspond to each other on the respective sub-assemblies of the vessel undergoing assembly. Thus, for example, it is necessary to ensure a very good alignment between the axes of the keyways of the vessel flange and the axes of the supports for the internal fitments.

In order to achieve this perfect alignment it is necessary to achieve the alignment of the axes of the two sub-assemblies, both possessing symmetry of revolution about the axis of the vessel, to achieve perfect centering of one sub-assembly relative to the other along their mating surface and to ensure perfect positioning with regard to the orientation of one sub-assembly relative to the other, about the axis of the vessel.

Both the sub-assemblies with symmetry of revolution about the vertical axis of the vessel comprise, at their mating ends, an annular mating surface along which the assembly of the two sub-assemblies takes place in order to produce the vessel.

Before assembly, during the final machining operations on the two sub-assemblies, projecting ridges are produced on these mating surfaces, these ridges being brought into contact during the operation of bringing the two sub-assemblies together before the operation of producing the final welded joint.

One of these ridges is machined on each of the mating surfaces, in a central part of the annular surface and extending over the whole periphery of the vessel.

A further ridge is also machined on each of the mating surfaces, along the inner perimeter of the mating surface and also extending over the whole periphery of the vessel.

At the moment of bringing the sub-assemblies into contact, it is therefore necessary to bring each of the ridges of one sub-assembly into coincidence with its counterpart on the other sub-assembly.

In bringing the two central ridges into coincidence, two spaces are defined between the mating surfaces of the two sub-assemblies and separated by a wall formed by the two central ridges.

The external annular space, limited by the mating surfaces and the central ridges, is open towards the exterior of the vessel and allows, when the positioning of the two sub-assemblies is achieved precisely, a first welding pass to be made by depositing filler metal in a part of the annular space.

The two sub-assemblies being united by this partial weld, it is then possible to remove, by machining, both the inner and the central ridges and part of the filler metal, after this had solidified.

The final assembly of the vessel is achieved by depositing filler metal in the whole of the volume of the two annular spaces.

This way of working necessitates the machining, to tight tolerances, of large annular ridges which extends over the whole periphery of the vessel.

Furthermore, at the time when the two sub-assemblies are brought together, it is very difficult to achieve, simultaneously, the alignment of the axes of the two sub-assemblies with the axis of the vessel, the centering of the supports relative to each other, and the precise orientation of the two sub-assemblies relative to each other.

It is an object of the invention to provide a process for the final assembly of a nuclear reactor vessel comprising two sub-assemblies possessing symmetry of revolution, which sub-assemblies have been assembled and machined to provide elements for positioning the internal fitments of the vessel and which have been provided with annular mating surfaces in planes perpendicular to said axes of synmmetry of said sub-assemblies and with assembly ridges projecting from each said mating surface at a median part of said surface and extending over the complete perimeter of said surface, said process comprising arranging said sub-assemblies with said axes thereof horizontal and with said mating surfaces thereof facing, bringing said ridges into contact and coincidence thereby defining two annular spaces between said mating surfaces, one said space opening into the interior of said vessel and the other said space opening into the exterior over the whole periphery of said vessel, said spaces being separated by a wall formed by said contacting ridges, initially welding said sub-assemblies by deposition of a filler metal in one of said spaces, removing by machining said ridges and part of said deposited metal, and finally welding said sub-assemblies by deposition of filler metal in said annular spaces between said mating surfaces, said process additionally comprising providing at the level of one of said annular spaces at least three female centering stubs projecting from said mating surface of one of said sub-assemblies, each said female stub having an associated seat recessed relative to the outer surface of said stub, said female stubs extending over a fraction of said perimeter of said vessel, providing at least three male centering stubs on said mating surface of the other said sub-assembly, the shape, size and position thereof corresponding to the shape, size and position of said seats of said female stubs, said male stubs and female stubs being in positions matched in a precise manner relative to said positioning elements for internal fitments of said vessel, and at least one of said male stubs and at least one of said female stubs together providing a radially directed key socket, introducing said male stubs into said seats of said corresponding female stubs when bringing said ridges into contact to simultaneously achieve centering, axial alignment and orientation of said sub-assemblies relative to one another, checking alignment thereof preferably by an optical method, inserting a key into said socket provided by said pair of stubs, which socket has been obtained by bringing said sub-assemblies into contact and orientation, to maintain the relative positioning of said sub-assemblies, joining said stubs together by point-welds before effecting initial welding, and, after initial welding, removing said male and female stubs by machining when removing said ridges and before completely filling said annular spaces with filler metal.

An embodiment of an assembly process according to the invention will now be described, by way of example only, in the case of a vessel for a pressurised-water nuclear reactor, formed by an upper sub-assembly and by a lower sub-assembly.

Figure 1:
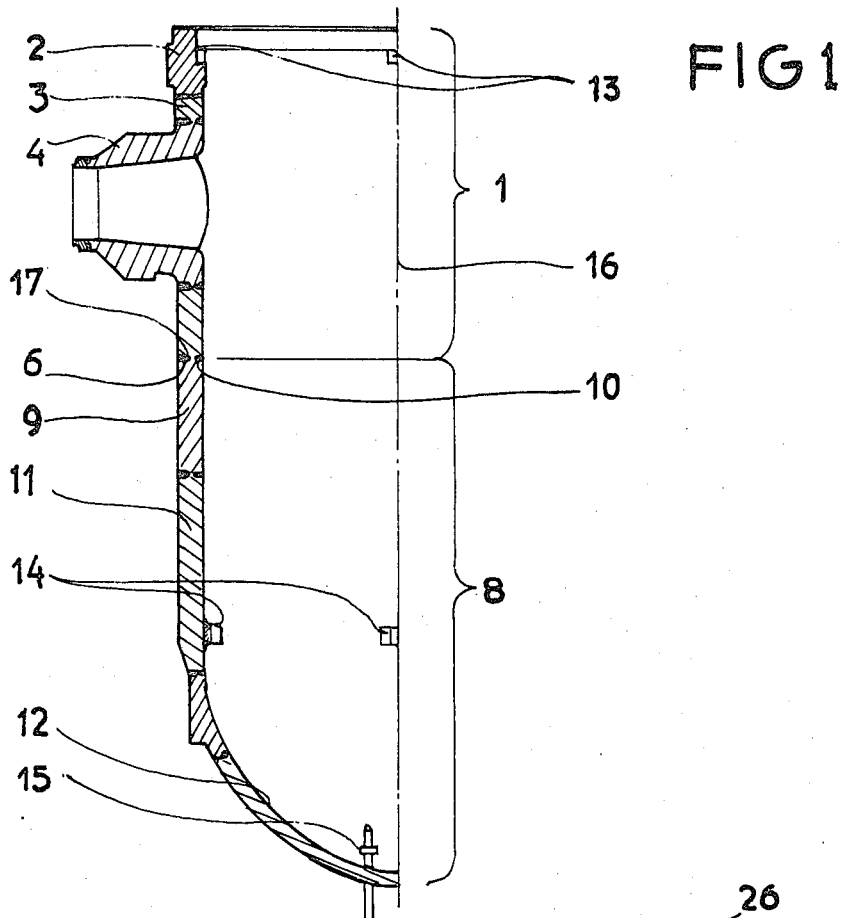
FIG. 1 is a half sectional view, in a vertical plane, of a vessel for a pressurised-water nuclear reactor, after its final assembly.

In FIG. 1, a vessel is shown in its completed condition, after the final joint between the two sub-assemblies, 1,8 thereof has been produced.

The upper sub-assembly 1 is formed by several circular sections, which are welded together along mating surfaces perpendicular to the axis 16 of the vessel.

The elements composing the upper sub-assembly are a vessel flange 2 and a ring 3 carrying pipe connections 4 for the entry and exit pipes for the primary fluid.

The lower end of the ring 3 is machined to provide a mating surface 6, permitting assembly by welding to the lower sub-assembly 8, which is composed of, successively, a core ring 9, provided at its upper end the mating surface 10, a lower ring 11 and a spherical end cap 12.

During the machining operations performed on the upper sub-assembly 1, key sockets 13 are provided in the vessel flange 2, for guiding the internal fitments of the vessel when they are being introduced into the vessel.

The lower sub-assembly comprises, on the internal part of the lower end of the lower ring 11, supports, such as 14, for guiding the internal fitments.

The spherical end cap 12 is penetrated by tubular instrumentation passages 15, of which the precise positioning and orientation in the vertical direction must be ensured when the vessel is being assembled and after the assembly operation.

When the vessel is assembled, as shown in FIG. 1, the axes of the supports 14 are perfectly aligned with the axes of the keyways 13 machined in the vessel flange.

The axis of the vessel 16, which is vertical when the vessel is in service, is the axis of symmetry which is common to the two sub-assemblies 1 and 8.

In order to effect the assembly of the sub-assemblies 1 and 8, a final joint 17 is produced by depositing filler metal in annular recesses arranged between the two mating surfaces 6 and 10, in accordance with the process according to the invention or in accordance with the prior processes, the axis 16 of the vessel being arranged horizontally during these operations.

Figure 2:
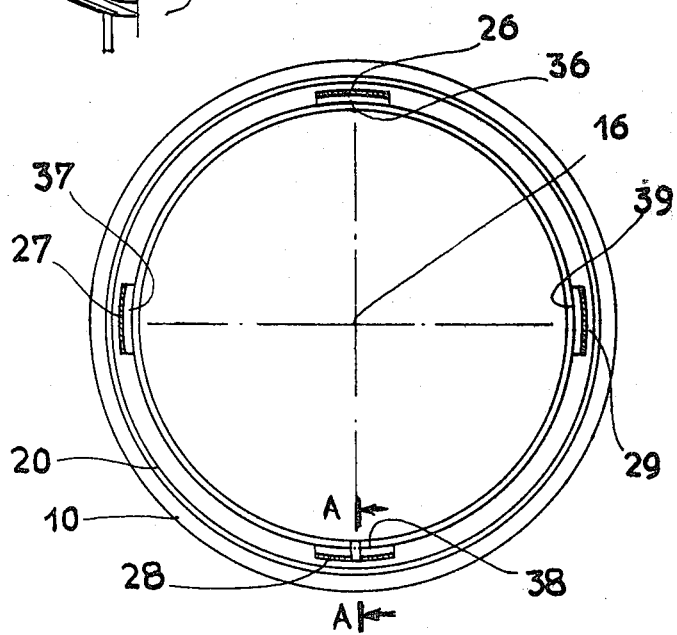
FIG. 2 is a plan view of the vessel at the level of the final joint between the two sub-assemblies, after these two sub-assemblies have been brought together and before the welded joint has been made.

In FIG. 2 the lower mating surface 10, machined on the upper end of the core ring 9 can be seen, as can an annular ridge 20 is provided, over the complete perimeter of the vessel, at the time of machining the lower sub-assembly 8.

Figure 3:
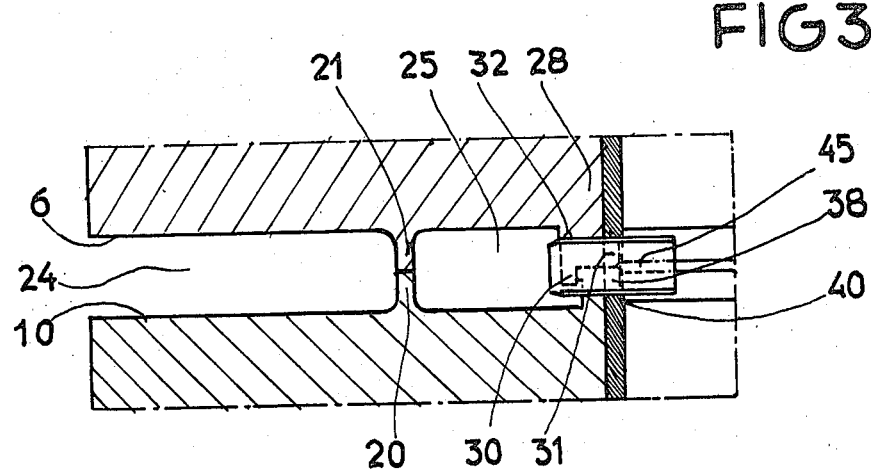
FIGS. 3, 4 and 5 represent sectional views along the line A—A of FIG. 2, during different stages of the assembly operation.

Referring simultaneously to FIGS. 2 and 3, the ring 3 of the upper sub-assembly 1 is seen to terminate in the mating surface 6, on which an annular ridge 21 has been machined, ridge 21 being identical to the ridge 20. Ridge 21 comes into contact with the ridge 20 when the two sub-assemblies are brought together, in order to form a continuous wall between annular spaces 24 and 25, inside which the filler metal will be deposited during completion of the assembly.

FIGS. 3 and 3 also show that the upper sub-assembly 1 comprises, on its mating surface 6, at least three and preferably, as shown, four female projections or stubs 26, 27, 28 and 29 (shown in section in FIG. 2) which are respectively centered on the positions 0°, 270°, 180° and 90° of the vessel, considering rotation of the vessel about its axis 16.

Each of the female stubs, such as stub 28 shown in FIG. 3, comprises a projecting part 30, extending beyond the mating plane between the ridges 20 and 21 and a rebate or seat 31 at the level of the mating plane between the ridges 20 and 21.

A radially directed key socket 32 is provided in the female stub 28.

The female stubs 26, 27 and 29 are not provided with such key sockets.

The lower sub-assembly 8 also comprises, on its upper end, that is to say on the upper end of the core ring 9, male centering stubs 36, 37, 38 and 39.

As shown in FIG. 3 the male centering stub 38 is provided with a key socket 40, unlike the centering stubs 36, 37 and 39 which are not provided with such a socket.

Each of the male and female stubs extends over a short length of the circumference of the vessel and is produced by machining on a miller-reamer. These stubs are of cylindrical form and are centered relative to the components for positioning the internal fitments of the vessel, that is to say relative to the axes of the keyways for guiding the internal fitments on the vessel flange, or relative to the axis of the supports of the internal fitments on the lower ring.

Furthermore, the shape and size of the male stubs correspond to the shape and size of the seats or rebates in the corresponding female stubs.

In this way, at the moment of bringing the sub-assemblies together, the male stubs come into position in the seats of the female stubs, as can be seen from FIG. 3.

Once the machining of the mating surfaces, the ridges and the centering stubs has been effected, during the final machining operation on the sub-assemblies, each of the sub-assemblies is placed in position on rotary manupulators, arranged in alignment with each other, these manipulators allowing rotation of each of the sub-assemblies about their horizontally arranged axes of symmetry.

The lower sub-assembly 8 is placed on the site manipulator and is brought into position by rotation about its own axis of symmetry, in such a way that the key socket 40, machined in the male stub 38, is arranged with its axis vertical in the lower part of the sub-assembly.

Attention is then transferred to the upper sub-assembly, which has previously been oriented so that the position of its female centering stubs substantially corresponds to that of the male centering stubs of the lower sub-assembly, using a positioning crane which allows the two sub-assemblies to be brought together by engaging the male stubs with the seats of the female stubs.

Before bringing the two sub-assemblies together, the site manipulator supporting the upper sub-assembly is adjusted so that its rollers come into position beneath the vessel flange of the upper sub-assembly 1.

The manipulator supporting the lower sub-assembly is then adjusted to take account of any possible ovalisation of the components to be assembled.

During the bringing together of the stubs, the male stub 36 comes into position in the female stub 26, the male stub 37 comes into position in the female stub 27, the male stub 38 into the female stub 28 and the male stub 39 into the female stub 29.

A sighting tube is then used to check the agreement between the axes defined by the internal supports of the internal fitments of the vessel, arranged at the level of the lower sub-assembly of the vessel, and the axes of the key sockets arranged at the level of the upper sub-assembly of the vessel, which procedure allows the positioning of the two sub-assemblies to be checked simultaneously with regard to the alignment of the axes, the centering of the two sub-assemblies and their orientation.

After engagement of the male stubs in the female stubs and the positioning of the two sub-assemblies, the two key sockets arranged in the stubs 28 and 38 will have come into register so that it is then possible to introduce a key 45 into the socket formed by the sockets 32 and 40, which key 45 maintains the two sub-assemblies in position, at least insofar as the orientation about the axis of these sub-assemblies is concerned.

Sighting marks are then placed at three points on the vessel, one at the bottom of the vessel, another in the zone of the final joint and the third on the vessel flange. With the aid of a sighting tube it is then possible to locate any possible alignment faults affecting the vessel and to rectify these faults by displacing the sub-assemblies in the vertical direction, by means of jacks which enable perfect contact to be established between the surfaces of the corresponding male and female stubs.

Perfect positioning of the sub-assemblies has thus been achieved, one with respect to the other, both with regard to alignment and with regard to the centering and the orientation about the axis of the vessel, by virtue of the centering stubs machined in positions precisely defined in relation to the centering and positioning components arranged inside the vessel.

The stubs can then be fixed to each other by spot welds and, using the sighting tube, it is possible to check that the alignment of the two sub-assemblies is still good.

Figure 4:
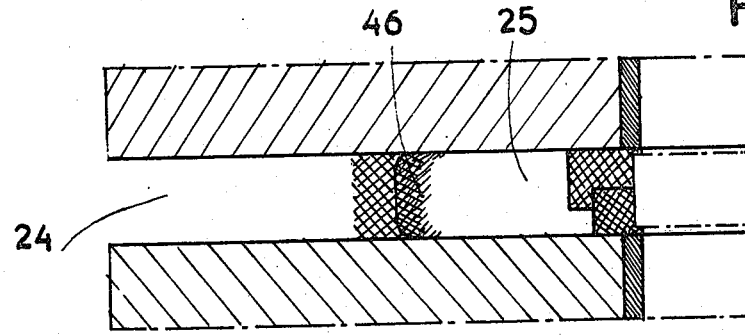
Figure 5:
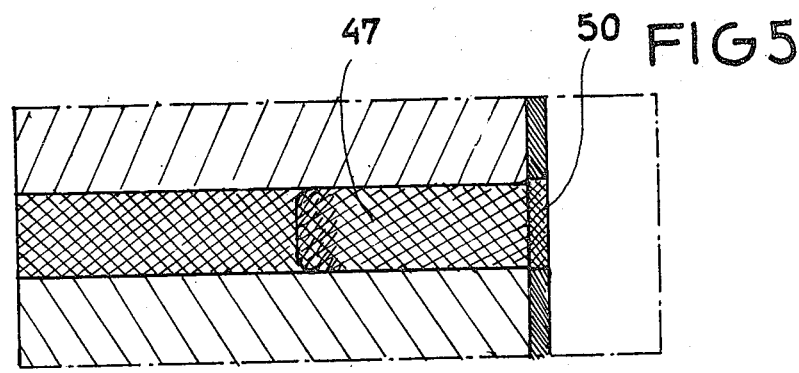

It is then possible to carry out deposition of filler metal inside the outer annular space 24, as can be seen in FIG. 4. This partial deposit of filler metal 46 in the bottom of the annular space 24, against the ridges 20 and 21, allows the two sub-assemblies to be finally fixed together relative to each other.

The male and female centering stubs are then removed by machining, working from inside the vessel.

During the same machining operation, the ridges 20 and 21 and a part of the deposited metal 46 are subsequently removed, as is shown in FIG. 4, where the removed stubs are represented by the cross hatched areas, as is the deposited metal 46.

The assembly of the two sub-assemblies is then completed by depositing filler metal inside the annular spaces 24 and 25 so as to fill them completely with filler metal 47.

The joint zone is preheated during all welding operations, in order to facilitate the welding.

As far as the filling of the space 24 is concerned, the welding operations are performed from the outside of the vessel, and they are performed from the inside of the vessel with regard to filling the annular space 25.

The assembly operation is completed by covering the weld on the inside of the vessel with a coating 50 of stainless steel.

It is thus seen that one of the advantages of the above described process is the achievement, in virtually a single operation, perfect positioning of the two sub-assemblies forming the vessel, by virtue of the centering stubs.

Another advantage of the process is that, apart from machining the ridges 20,21, no other machining of the mating ends of the sub-assemblies is required other than that of the stubs which occupy a small part of the periphery of the vessel, which renders the machining operation easier.

Since the stubs are machined during the machining operations on the interior of the sub-assemblies, it is very easy to centre these stubs on the axes of the elements which guide and support the internal fitments of the vessel.

Finally, the presence of a key, which allows the male and female centering stubs, that is to say the two sub-assemblies, to be firmly fixed temperorarily, allows errors in positioning to be avoided, insofar as the relative orientation of the two sub-assemblies about the vessel axis is concerned.

However, the invention is not intended to be restricted to the embodiment which has just been described but on the contrary includes all the variants.

It is thus possible to envisage the production of centering stubs in an operation which differs from a machining operation on the sub-assemblies, for example by providing the stubs on the mating surfaces of the two sub-assemblies, and it is equally possible to envisage stubs of a different shape, after the point where the male stubs can engage in the female stubs in order to position the corresponding sub-assembly in an extremely precise way, with regard to its alignment, its centering and its orientation relative to the other sub-assembly.

Finally, the process according to the invention is applicable not only to the manufacture of vessels for pressurised-water nuclear reactors, but equally to the manufacture of vessels for nuclear reactors of another type, the manufacture of which requires preliminary assembly of two sub-assemblies having a symmetry of revolution relative to the axis of the vessel.

We claim:

1. A process for the final assembly of a nuclear reactor vessel comprising two sub-assemblies possessing symmetry of revolution, which sub-assemblies have been assembled and machined to provide elements for positioning the internal fitments of the vessel and which have been provided with annular mating surfaces in planes perpendicular to said axes of symmetry of said sub-assemblies and with assembly ridges projecting from each said mating surface at a median part of said surface and extending over the complete perimeter of said surface, said process comprising arranging said sub-assemblies with said axes thereof horizontal and with said mating surfaces thereof facing, bringing said ridges into contact and coincidence thereby defining two annular spaces between said mating surfaces, one said space opening into the interior of said vessel and the other said space opening into the exterior over the whole periphery of said vessel, said spaces being separated by a wall formed by said contacting ridges, initially welding said sub-assemblies by deposition of a filler metal in one of said spaces, removing by machining said ridges and part of said deposited metal, and finally welding said sub-assemblies by deposition of filler metal in said annular spaces between said mating surfaces, said process additionally comprising providing at the level of one of said annular spaces at least three female centering stubs projecting from said mating surface of one of said sub-assemblies, each said female stub having an associated seat recessed relative to the outer surface of said stub, said female stubs extending over a fraction of said perimeter of said vessel, providing at least three male centering stubs on said mating surface of the other said sub-assembly, the shape, size and position thereof corresponding to the shape, size and position of said seats of said female stubs, said male stubs and female stubs being in positions matched in a precise manner relative to said positioning elements for internal fitments of said vessel, and at least one of said male stubs and at least one of said female stubs together providing a radially directed key socket, introducing said male stubs into said seats of said corresponding female stubs when bringing said ridges into contact to simultaneously achieve centering, axial alignment and orientation of said sub-assemblies relative to one another, checking alignment thereof preferably by an optical method, inserting a key into said socket provided by said pair of stubs, which socket has been obtained by bringing said sub-assemblies into contact and orientation, to maintain the relative positioning of said sub-assemblies, joining said stubs together by point-welds before effecting initial welding, and, after initial welding, removing said male and female stubs by machining when removing said ridges and before completely filling said annular spaces with filler metal.

2. A process according to claim 1, wherein said male stubs and said female stubs are produced on the corresponding said sub-assemblies during a final machining operation on said sub-assemblies while in a horizontal position.

3. A process according to either claim 1 or claim 2, wherein said vessel is for a pressurised-water reactor and four said centering stubs are arranged on each of said sub-assemblies, said stubs being centered on the axes of key ways provided on the vessel flange of one of said sub-assemblies which is the upper sub-assembly, during the final machining of said upper sub-assembly, and on the axes of the supports for internal fitments of said vessel which are provided on the other said sub-assembly which is the lower sub-assembly.

4. A process according to claim 1, wherein the alignment of said two sub-assemblies is checked using a sighting tube and sight marks placed at precise positions on said vessel.

5. A process according to claim 1, wherein said sub-assemblies are initially placed on site manipulators which allow them to be rotated about their axes of symmetry during assembly operations, one of said sub-assemblies being manoeuvred by a travelling crane which allows said male stubs to be engaged in said seats of said female stubs.

* * * * *